United States Patent Office 3,401,307
Patented Sept. 10, 1968

3,401,307
ELECTRICAL PROTECTIVE RELAY ARRANGEMENT
Hans Hoel, Oslo, Norway, assignor to The English Electric Company Limited, London, England, a British company
Filed Mar. 21, 1966, Ser. No. 535,918
Claims priority, application Great Britain, Mar. 22, 1965, 12,075/65
9 Claims. (Cl. 317—27)

ABSTRACT OF THE DISCLOSURE

This invention relates to a polyphase relay including transformer means for monitoring the voltage and current in a power transmission system and a gating device responsive to the voltage signal for permitting the current signal to be applied to a detector circuit only during a predetermined period of the voltage cycle, the detector being operable to determine from the magnitude and polarity of the current signal applied during said period an indication of any deviation from a predetermined value of phase angle between the voltage and current in the system. In this manner, fault conditions existing in the system can be detected; earth faults affecting the system may also be detected by additional comparison between the zero sequence components of voltage and current.

---

The invention relates to polyphase relays.

According to the invention a polyphase relay comprises first and second means respectively monitoring the voltage and current in a power transmission system gating means connected to both the first and the second means and operable to permit said monitored current to be applied to a detector circuit during only a predetermined period of the voltage cycle, the detector circuit being operable to determine the mean magnitude and the polarity of the current applied thereto during said period whereby to provide an indication of any deviation from a predetermined value of phase angle between the voltage and current in the system.

According to a feature of the invention the relay may include third and fourth means for respectively monitoring the zero sequence components of the said voltage and current, further gating means connected to both the third and fourth means and operable to permit said zero sequence component of current to be applied to the said detector during only a predetermined period of the cycle of the zero sequence components of voltage, the detector circuit being operable to determine the mean magnitude and the polarity of the zero sequence components of current applied thereto whereby additionally to provide an earth fault indication.

According to another feature of the invention the or each said gating means may be voltage-actuated and operable to permit the passage of its associated current signal only during each complete half cycle of the voltage.

According to another feature of the invention the relay may include at least one first and one second means for comparing together the voltage and current in a power transmission system to produce a control signal dependent both on the magnitude of the current and its deviation from a predetermined value of phase angle with respect to the voltage, and detector means responsive to the control signal for producing an output signal indicative of the occurrence of a predetermined power factor in the system determined by the said predetermined value.

According to another feature of the invention gating means may be included respectively associated with the first and second means and with the third and fourth means and connected by a common circuit to the detector means, and unidirectional conducting means included associated with each of the gating means for preventing a flow of current in a direction towards the first and second, and third and fourth means so that the control signal supplied to the detector means is at all times dependent on the control signal which has the maximum instantaneous value.

Figure 1:
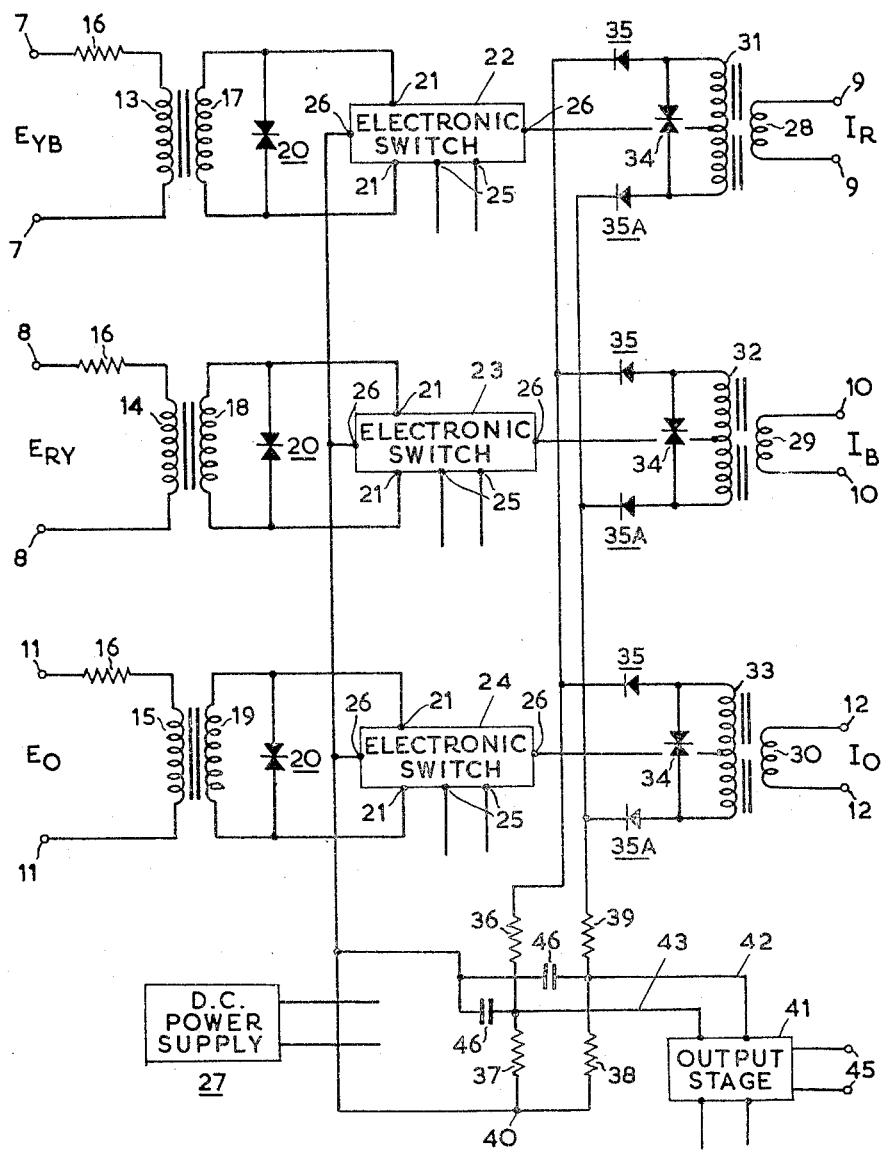
Figure 2A:
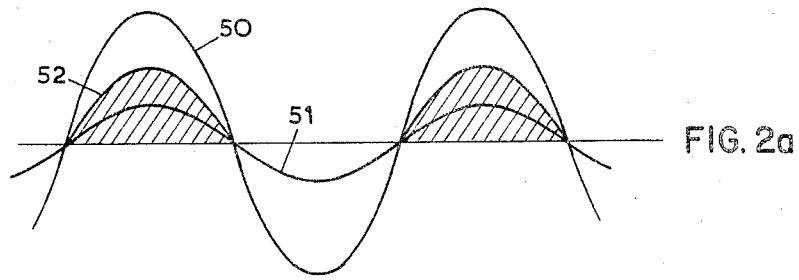
Figure 3:
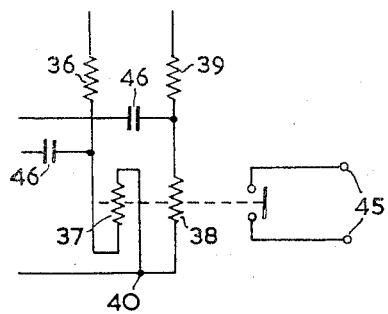
Figure 4:
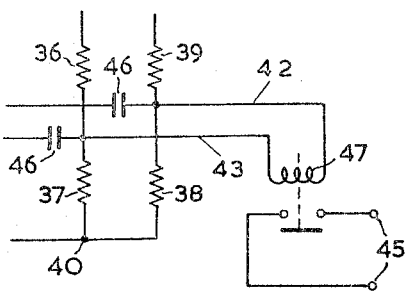

A three-phase directional relay incorporating the invention will now be described by way of example with reference to the accompanying drawings in which:

FIG. 1 shows a schematic circuit diagram of the relay;
FIG. 2 shows waveforms of voltages and currents occurring in the relay; and
FIGS. 3 and 4 show modifications to part of the circuit of FIG. 1.

Referring to FIG. 1, the relay is arranged to monitor the direction of power flow in a three-phase power transmission system 6 having three phases, Red, Yellow and Blue. The relay has six pairs of A.C. input terminals 7 to 12 which receive various input signals proportional to the voltages and currents in the system. Terminals 7 receive an input signal proportional to the voltage between the Yellow and Blue phases: this signal will be referred to as $E_{YB}$. Terminals 8 receive an input signal proportional to the voltage between the Red and Yellow phases: this signal will be referred to as $E_{RY}$. Terminals 9 receive an input signal proportional to the current in the Red phase: this signal will be referred to as $I_R$. Terminals 10 receive an input signal proportional to the current in the Blue phase: this signal will be referred to as $I_B$. Terminals 11 and 12 respectively receive signals proportional to the zero sequence symmetrical components of the voltage and current in the system. These signals will be referred to as $E_O$ and $I_O$. The connections between the transmission system and the relay have been omitted for clarity as they are of well known type embodying current and voltage transformers.

The pairs of terminals 7, 8 and 11 are respectively connected across the primary windings 13, 14 and 15 of voltage transformers through resistors 16, the latter providing fine voltage adjustment. Each voltage transformer has a secondary winding 17, 18 and 19 which is connected across a voltage limiting non-linear resistor 20 and to terminals 21 of an electronic switching circuit 22, 23 and 24. Each electronic switching circuit has two other pairs of terminals referenced 25 and 26. Terminals 25 are connected to a common source of D.C. power 27 for energising the switching circuit; these connections have been omitted for clarity. Each switching circuit is arranged so that a through circuit exists between the terminals 26 only when a particular one of the terminals 21 is positive with respect to the other. In such a condition, the switching circuit is said to be ON. Each switching circuit is thus switched ON during alternate half-cycles of the voltage signals at terminals 7, 8 and 11.

The pairs of terminals 9, 10 and 12 are respectively connected across the primary windings 28, 29 and 30 of three transactors. Each transactor has a secondary winding 31, 32 and 33 which produces voltage signals proportional to the current in the primary winding. A voltage limiting non-linear resistor 34 is connected across each secondary winding 31, 32 and 33. The three secondary windings 31, 32 and 33 are connected in parallel through rectifiers 35 and 35A and resistors 36, 37, 38 and 39 to a common point 40 which is connected to one of the terminals 26 on each electronic switching circuit 22, 23 and 24. The other terminal 26 on switching circuit 22 is connected to the mid-point of secondary winding 31, the other terminal 26 of switching circuit 23 is connected to the mid-point of secondary winding 32 and the other terminal 26 of switching circuit 24 is connected to the mid-point of secondary winding 33.

An output stage 41 is connected by lines 42 and 43 to compare the voltages respectively produced across resistors 37 and 38. The output stage 41 is supplied with D.C. power from the source 27 by connections not shown and has a pair of output terminals 45. Capacitors 46 are provided for smoothing purposes.

The operation of the circuit will now be described. At unity power factor $E_{YB}$ will be 90° out of phase with $I_R$ so it is necessary to turn one or both these vector quantities to be in phase with one another for such a condition. That is, for unity power factor the voltages supplied from the windings 17 and 31 must be arranged to be in phase; such phase shifting is carried out by any known method and in this instant by the transactors 28 and 29. In contrast $E_O$ and $I_O$ will be in phase at unity power factor so that little or no phase shifting is desired; in consequence a phase shifting circuit (not shown) is connected across the winding 33 to compensate for this particular transactor phase shift.

Currents produced by the voltages respectively developed across the secondary windings 31, 32 and 33 can only flow through the respective electronic switching circuits (when the switching circuits are ON) in one direction. In FIG. 2(a), the waveform 50 shows the voltage developed across a particular secondary winding on one of the transactors. It will be assumed to be the voltage developed across the winding 31 and thus represents the signal $I_R$. The waveform 51 shows the voltage across the winding 17 and thus represents the voltage $E_{YB}$. The waveform 52 represents the current driven through the switching circuit 22 by the voltage across the winding 31. It will be seen that the curent only flows when the switching circuit 22 is switched on during alternate (positive) half-cycles of the voltage across winding 17. No current flows during the intervening half-cycles (negative). Thus, since the voltages across the windings 17 and 31 are in phase, current will flow only during positive half-cycles of the voltage across the secondary winding 31. Accordingly current will flow through one only of the two resistors 37, 38, i.e. through resistor 37. This represents the unity power factor condition.

Figure 2B:
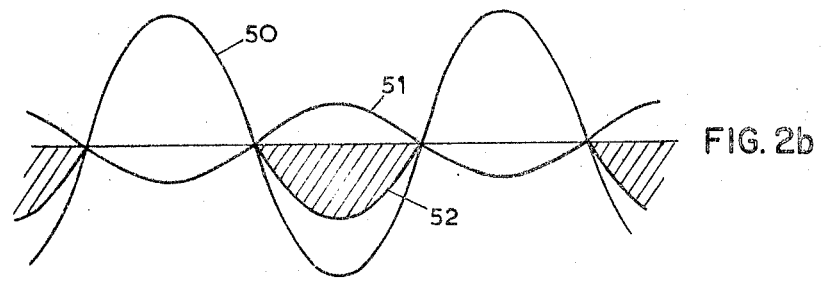

FIG. 2(b) shows a case when conditions in the transmission system are such that the phase angle between the voltage across winding 17 and the voltage across winding 31 is 180°. The current provided by the voltage across the secondary winding 31 therefore flows only during negative half-cycles of this voltage, and its current therefore flows through the resistor 38. This represents the conditon of maximum reverse power flow.

Figure 2C:
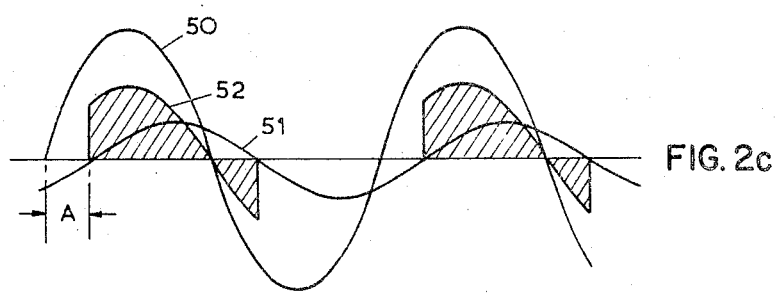

FIG. 2(c) shows an intermediate case where conditions in the power supply line are such that a phase angle A, having a value between 0° and 180°, exists between the voltage across winding 17 and the voltage across the secondary winding 31. The current flows through the switching circuit during part of each half-cycle of the voltage across the secondary winding 31 and therefore flows through both resistors 37 and 38. If A is 90°, then it will be seen that equal currents flow through resistors 37 and 38 in successive half-cycles.

Thus, it will be seen that, as shown by FIGS. 2(a) to 2(c), a comparison of the voltage across resistors 37 and 38 will give a measure of the phase relationship between the voltage across winding 17 and the voltage across winding 31. This in turn is a measure of the phase relationship between the voltage $E_{YB}$ between the Yellow and Blue phases and the current $I_R$ in the Red phase of the power transmission line and hence the power factor. It is therefore seen from FIG. 2 that provided the difference between the values of voltage across resistors 37 and 38, integrated over at least one complete cycle, is greater than zero the power flow is in a forward direction. If the difference voltage is negative then power must be flowing in a reverse direction. Such a condition represents a fault condition.

In practice, the voltages developed across the resistors 37 and 38 depend not only on the phase relationship between the voltage $E_{YB}$ and the current $I_R$, but also on the phase relationship between the voltage $E_{RY}$ and the current $I_B$ and the phase relationship between the zero sequence voltage $E_O$ and current $I_O$. However, by the action of the diodes 35 and 35A only the instantaneous maximum positive and negative values of voltage cause currents to flow in the resistors 37 and 38 respectively at any instant.

The relay is sensitive to earth faults by having its operation partially dependent on the zero sequence voltage and current components.

The relay can be made more sensitive to earth faults by increasing the number of turns on the primary winding 30 as compared with the number of turns on the primary windings 28 and 29.

An important feature to be noted, however, is that the current in the resistors 37 and 38 is not only dependent on all the above-mentioned phase relationships but also on the actual magnitudes of the various phase currents; it is not, however, affected by variation, within limits, of the phase voltages. Therefore, the relay will behave correctly provided the phase voltage continues to operate its respective electronic switch to allow the respective phase current to be supplied to one of the resistors 37 and 38.

It will be noted that the current through each of the electronic switching circuits 22 and 23 is dependent on the voltage between a pair of phases of the power transmission line and the current in the third phase. In the event of a fault between two phases reducing the phase voltage to a very small amount, insufficient to operate its associated electronic switching circuit, but at the same time increasing the current, the relay will still behave correctly because the appropriate switching circuit connected to the secondary winding of the transactor receiving the large load current will be compared with the voltage (of substantially normal value) between the other two phases.

The output stage 41 may be electronic in nature or may be a polarised relay. FIGS. 3 and 4 show how polarised relays can be used and in these figures parts which are similar to those shown in FIG. 1 are similarly referenced. In FIG. 3, the resistors 37 and 38 form the two coils of the relay. In FIG. 4, the relay has only one coil 47.

As shown in FIG. 1, the relay includes two comparators respectively for comparing a phase voltage with a phase current so as to respond to phase-to-phase faults, and a further comparator for comparing zero sequence voltage with zero sequence current so as to respond to earth faults. The relay, may, however, be modified to include other combinations of comparators.

The circuit may be modified by omitting one of the resistors 37 and 38, say the resistor 38. In such a case, the capacitor 46 which is connected to resistor 39, the resistor 39 itself, the rectifiers 35A, and the connections between all these components are also omitted. The electronic switches 22, 23 and 24 are connected to the ends of the windings 31 to 33 which were hitherto connected to the rectifiers 35A, instead of to the midpoints of the windings. The output stage 41 is then responsive only to the amplitude of the voltage developed across the resistor 37 which varies according to the direction of power flow in the transmission system; the rectifiers 35 may also be omitted if desired in this case.

Other phase shifting networks may be incorporated at various points in the relay in order to ensure that the output stage 41 operates when a particular phase angle is reached rather than to detect a reversal of power flow as described. For example, and considering only one pair of inputs, a 45° angle for maximum sensitivity may be obtained by initially setting up the relay so that the voltages across, say, the winding 31 lags a current $I_R$ in the primary winding 28 by 45°. Thus, at the instant when the integrated difference voltages across the resistors 37 and 38 change polarity the angle between the current $I_R$ and voltage $E_{YB}$ may be either 45° ($I_R$ lagging $E_{YB}$) or 135° ($I_R$ leading $E_{YB}$). If these two angles are bisected the angle of a maximum sensitivity is obtained and occurs when the current $I_R$ leads the voltage $E_{YB}$ by 45° for a fault in the relay operating direction or when the current $I_R$ lags the voltage $E_{YB}$ by 135° for a fault in the relay non-operating direction. It will be appreciated that other values of phase angle may be detected in this way.

What I claim as my invention and desire to secure by Letters Patent is:

1. A polyphase relay comprising first and second means respectively monitoring the voltage and current in a power transmission system, gating means connected to both the first and the second means and operable to permit said monitored current to be applied to a detector circuit during only a predetermined period of the voltage cycle, the detector circuit being operable to determine the mean magnitude and the polarity of the current applied thereto during said period whereby to provide an indication of any deviation from a predetermined value of phase angle between the voltage and current in the system.

2. A relay according to claim 1, including third and fourth means for respectively monitoring the zero sequence components of the said voltage and current, further gating means connected to both the third and the fourth means and operable to permit said zero sequence component of current to be applied to the said detector during only a predetermined period of the cycle of the zero sequence components of voltage, the detector circuit being operable to determine the mean magnitude and the polarity of the zero sequence components of current applied thereto whereby additionally to provide an earth fault indication.

3. A relay according to claim 1 for monitoring the voltage and current in a three-phase system, wherein the said first means is operable to monitor the voltage between two of said phases and the second means is operable both to monitor the current in the other phase and to phase shift this current by a predetermined amount relative to the phase voltage.

4. A relay according to claim 1, wherein the or each said gating means is voltage-actuated and is operable to permit the passage of its associated current signal only during each complete half cycle of the voltage.

5. A polyphase relay including at least one first and one second means for comparing together the voltage and current in a power transmission system to produce a control signal dependent both on the magnitude of the current and its deviation from a predetermined value of phase angle with respect to the voltage, detector means responsive to the control signal for producing an output signal indicative of the occurrence of a predetermined power factor in the system determined by the said predetermined value, and third and fourth means for respectively comparing the zero sequence components of voltage and current in the system and for producing a second control signal dependent on the magnitude of this current and its angular deviation from the zero sequence voltage, the said detector means being responsive to this second control signal for producing in response to a predetermined value thereof an earth fault indicating output signal.

6. A polyphase relay including at least one first and one second means for comparing together the voltage and current in a power transmission system to produce a control signal dependent both on the magnitude of the current and its deviation from a predetermined value of phase angle with respect to the voltage, and detector means responsive to the control signal for producing an output signal indicative of the occurrence of a predetermined power factor in the system determined by the said predetermined value, the control signal being produced by a gating means connected in series between a current input circuit and the detector means, the gating means being controlled by its respective voltage to switch to a conductive state when that voltage has a magnitude of one polarity and to a non-conductive state when that voltage has a magnitude of the opposite polarity so that the control signal comprises a gated input current.

7. A three phase relay according to claim 5, wherein the voltage supplied to the first means is derived from the voltage between two of the phases and the current supplied to the second means is derived from the other phase, and including phase shifting means for phase shifting the current by a predetermined relative phase angle to the voltage before this current and voltage are compared by the said first and second means.

8. A three phase relay according to claim 7, wherein the said current is phase shifted by 90° so that the voltage and current signals are in phase at unity power factor.

9. A relay according to claim 6, wherein gating means respectively associated with the first and second means and with the third and fourth means is connected by a common circuit to the detector means, and including unidirectional conducting means associated with each of the gating means for preventing a flow of current in a direction towards the first and second, and third and fourth means so that the control signal supplied to the detector means is at all times dependent on the control signal which has the maximum instantaneous value.

References Cited

UNITED STATES PATENTS

| | | | |
|---|---|---|---|
| 1,557,038 | 10/1925 | Evans | 317—47 X |
| 2,558,609 | 6/1951 | Davis | 324—86 X |
| 2,941,146 | 6/1960 | Miller | 324—86 X |
| 3,209,204 | 9/1965 | Rockefeller | 317—47 X |

LEE T. HIX, *Primary Examiner.*

J. D. TRAMMELL, *Assistant Examiner.*